United States Patent [19]
Callaway

[11] Patent Number: 5,663,624
[45] Date of Patent: Sep. 2, 1997

[54] CLOSED-LOOP METHOD AND APPARATUS FOR CONTROLLING ACCELERATION AND VELOCITY OF A STEPPER MOTOR

[75] Inventor: Robert P. Callaway, Vancouver, Wash.

[73] Assignee: Hewlett-Packard Company, Palo Alto, Calif.

[21] Appl. No.: 846,302

[22] Filed: Mar. 5, 1992

[51] Int. Cl.$^6$ .................................................. H02P 8/00
[52] U.S. Cl. ................................... 318/696; 318/254
[58] Field of Search ................................ 318/696, 685, 318/254, 138, 439

[56] References Cited

U.S. PATENT DOCUMENTS

| | | | |
|---|---|---|---|
| 4,440,512 | 4/1984 | Forcier | 400/144 |
| 4,449,082 | 5/1984 | Webster | 318/326 |
| 4,631,657 | 12/1986 | Hill et al. | 364/167 |
| 4,692,674 | 9/1987 | Packard et al. | 318/254 |
| 4,697,125 | 9/1987 | Goff et al. | 318/254 |
| 4,720,663 | 1/1988 | Welch et al. | 318/341 |
| 4,739,240 | 4/1988 | MacMinn et al. | 318/696 |
| 4,761,598 | 8/1988 | Lovrenich | 318/685 |
| 4,777,419 | 10/1988 | Obradovic | 318/696 |
| 4,851,755 | 7/1989 | Fincher | 318/696 |
| 4,933,620 | 6/1990 | MacMinn et al. | 318/696 |
| 4,961,038 | 10/1990 | MacMinn | 318/696 |
| 4,982,146 | 1/1991 | Moteki | 318/696 |
| 4,999,558 | 3/1991 | Onodera et al. | 318/685 |
| 5,103,225 | 4/1992 | Dolan et al. | 341/13 |

FOREIGN PATENT DOCUMENTS

| | | | |
|---|---|---|---|
| 0200959 | 12/1986 | European Pat. Off. | H02P 8/00 |
| 0401843 | 12/1990 | European Pat. Off. | H02P 8/00 |
| 55-34942 | 3/1980 | Japan | B41J 1/24 |
| 2-95200 | 6/1990 | Japan . | |
| 2-106199 | 7/1990 | Japan . | |

OTHER PUBLICATIONS

Bump, et al; *Character Impact Printer Offers Maximum Printing Flexibility;* Hewlett-Packard Journal, vol. 27, No. 10, pp. 19–23.

*Primary Examiner*—Brian Sircus

[57] ABSTRACT

A closed-loop method and apparatus for controlling acceleration and velocity of a stepper motor in which a motor shaft encoder is used to generate a signal proportional to shaft position. This signal is subtracted from the motor input signal to produce an error signal which is compared with a reference value. When the error is equal to the reference value the motor is stepped again. Between each step, the reference value is decreased if motor velocity is too high or increased if the motor velocity is too low.

11 Claims, 4 Drawing Sheets

Output Position φ out

Encoder Position Ke φ out

Position Generator φ ideal

Position Error φ error

Commutation Reference φ Reference

Motor Torque

CLOSED-LOOP METHOD AND APPARATUS FOR CONTROLLING ACCELERATION AND VELOCITY OF A STEPPER MOTOR

BACKGROUND OF THE INVENTION

1. Field of Invention

The present invention relates to closed-loop methods and apparatus for controlling acceleration and velocity of a stepper motor and more particularly to such methods and apparatus in which the stepper motor switching angle varies.

2. Description to Related Art

Most stepper motors are operated in an open-loop configuration. Given a known and fixed load driven by the stepper motor, a commutation (step) sequence can be developed by a person having ordinary skill in the art which accelerates the load to a desired velocity without a loss of steps. In other words, each time the motor is commutated the rotor is in a position in which torque generated by the electrical field advances the rotor until it is appropriately positioned for the next commutation, and so forth. In such open-loop configurations, if the load is different than that for which the commutation sequence was developed, steps can be lost to the extent that the rotor may not rotate at all.

Closed-loop configurations use feedback to sense rotor position via a conventional shaft encoder. The rotor position information may be utilized to produce each motor commutation. Most such configurations employ a fixed switching angle commutation. In other words, the motor is commutated each time the rotor advances through a predetermined angle. While the motor does not lose steps with this method, it cannot achieve a precise target velocity due to uncontrollable variance in parameters such as motor supply voltage, friction, etc. Also, if the load is different than that for which the commutation switching-angle was chosen, the stepper motor may run at a velocity very different from the desired velocity. Moreover, when a desired velocity is selected, the corresponding switching angle typically cannot be calculated with precision.

The foregoing prior art stepper motor systems will not accurately control the velocity and position of a load which varies with time. For example, in an ink jet printer, a stepper motor is typically used to drive and position a carriage upon which an ink cartridge is mounted. As the printer prints, the volume of ink in the cartridge decreases thus decreasing the cartridge mass. For the reasons described above, stepper motors configured in open-loop systems or in closed-loop systems utilizing fixed switching angles are not well suited to drive such a carriage.

Another problem associated with closed-loop stepper motor systems is that the shaft encoder and motor rotor must be characterized when the system is initially assembled. In other words, the relative angular positions of the rotor and encoder must be known.

SUMMARY OF THE INVENTION

The present invention comprises a method of controlling a stepper motor having a driven rotor. Rotor speed is sampled and compared with a preselected acceleration profile. The switching angle is adjusted to drive the rotor in accordance with the preselected acceleration profile.

A general object of the present invention is to provide a closed-loop method and apparatus for controlling acceleration and velocity of a stepper motor which overcomes the above-enumerated disadvantages associated with prior art methods and apparatus.

It is another object of the present invention to provide such a method and apparatus which is especially suitable for controlling velocity and acceleration of a time varying load.

It is another object of the present invention to provide such a method and apparatus which has improved steady-state velocity control.

It is another object of the present invention to provide such a method and apparatus which has similar operating characteristics to a DC servo-motor with substantially less expense.

These and other objects and advantages of the present invention will become more fully apparent when the following detailed description is read in view of the accompanying drawings.

DETAILED DESCRIPTION OF THE PREFERRED EMBODIMENT

Figure 1:
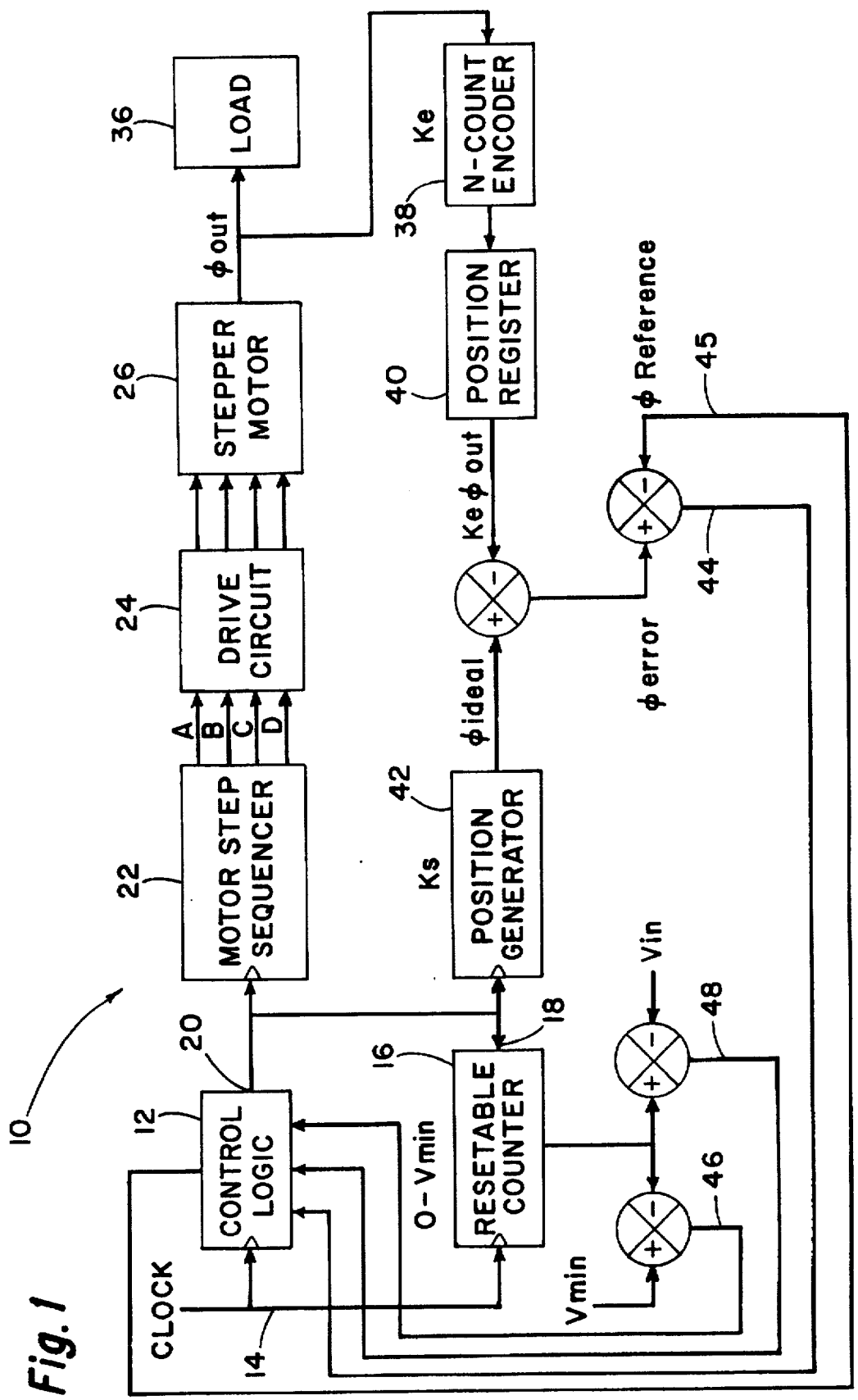
FIG. 1 is a schematic diagram of a stepper motor control system constructed in accordance with the present invention.

Indicated generally at 10 is stepper motor control circuit constructed in accordance with the present invention. Included therein is control logic 12 which in the present embodiment of the invention is implemented by a microprocessor and related computer code. Description of the operation of control logic 12 is illustrated in the flow chart of FIG. 3 which is described hereinafter. A CLOCK signal on conductor 14 is provided to control logic 12 and to a resetable counter 16. Counter 16 is incremented by one for each periodic CLOCK signal. A signal applied to terminal 18 resets counter 16 to zero whereupon incremental counting responsive to CLOCK signals begins again. Control logic 12 includes an output terminal 20 upon which appears a step signal which, as will be seen hereinafter, causes the stepper motor to be commutated.

The step signal is applied to a conventional motor step sequencer 22. The motor step sequencer produces outputs, on lines A, B, C, D, which are applied to a conventional drive circuit 24. Drive circuit 24 is connected to a conventional 15° 4-phase uni-polar stepper motor 26.

Motor step sequencer 22 includes logic which generates a digital output on lines A, B, C, D, as follows:

TABLE 1

|   | A   | B   | C   | D   |   |
|---|-----|-----|-----|-----|---|
| 7 | On  | Off | Off | On  | 0 |
| 6 | On  | Off | Off | Off | 1 |
| 5 | On  | Off | On  | Off | 2 |
| 4 | Off | Off | On  | Off | 3 |
| 3 | Off | On  | On  | Off | 4 |
| 2 | Off | On  | Off | Off | 5 |
| 1 | Off | On  | Off | On  | 6 |
| 0 | Off | Off | Off | On  | 7 |

For each step signal appearing on line 20, motor sequencer 22 repeatedly advances through the commutation sequence shown in Table 1. In the motor of the present embodiment of the invention, one-half step of the motor causes a 7.5° change in output shaft position. There are thus 360°/7.5°=48 half steps per revolution.

Figure 2:
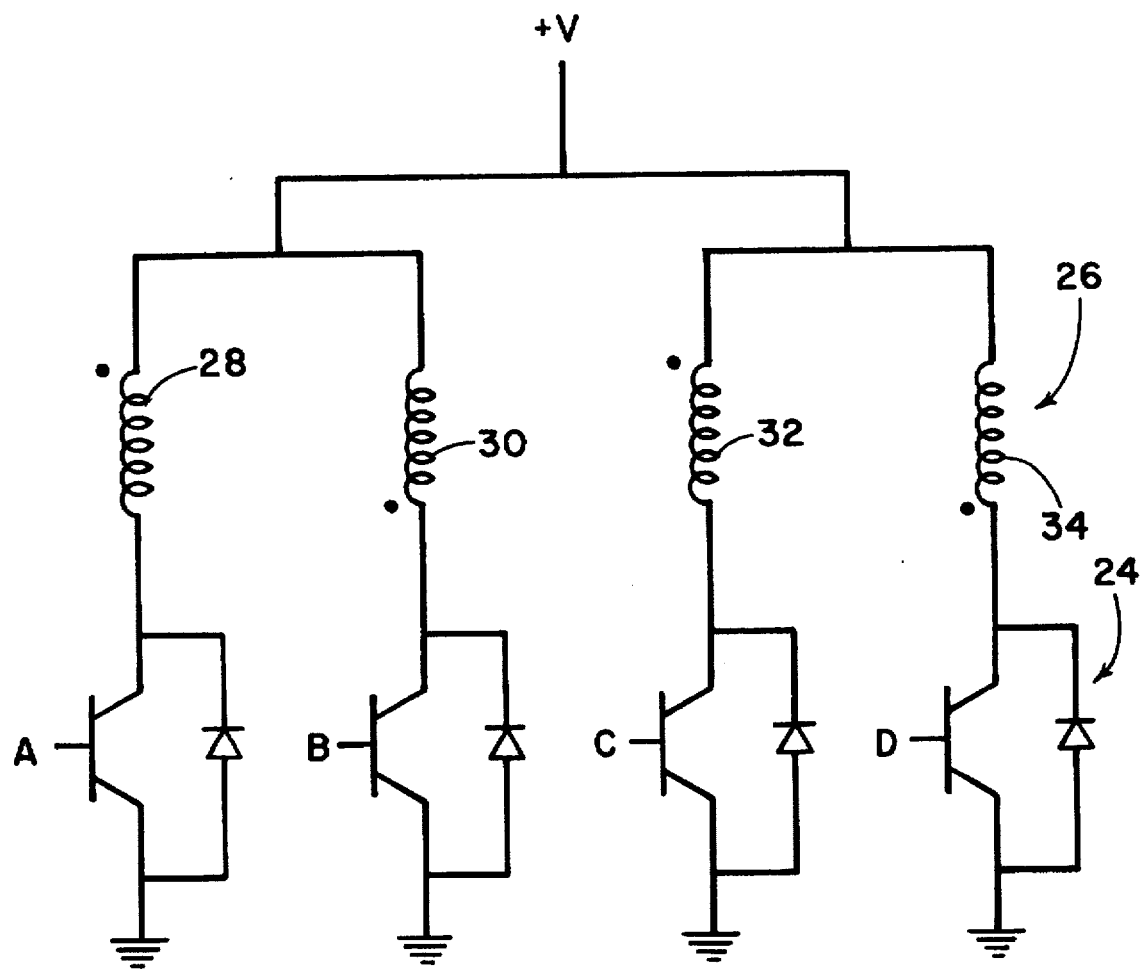
FIG. 2 is a schematic diagram of the stepper motor phases and drive circuit of FIG. 1.

Turning now to FIG. 2, stepper motor 26 includes phases 28, 30, 32, 34, which are energized in accordance with the commutation sequence of Table 1 by virtue of the switching action of the transistor associated with each phase. Such driving produces rotation of the rotor and shaft (not shown) of stepper motor 26. Motor shaft position is denominated φbout. The shaft is connected to a load 36 which in present embodiment of the invention comprises a printhead carriage on an ink jet printer. As printing proceeds, ink in a cartridge on the carriage is used thus changing the mass of load 36 with time.

An N-count encoder 38 is connected to the shaft of stepper motor 26. Encoder 38 is a conventional 2-channel incremental optical encoder which provides two square wave output channels in quadrature (90° phase) relationship. Position information is decoded by detecting the transitions from high to low of each channel and the level of the other channel. Such information provides both increment of rotation and direction of rotation. Such encoders always generate an integer number of "counts" per revolution. If the number of encoder counts per revolution is N, then there are N/(2Π) counts per radian. The counts per radian is the encoder gain, identified as Ke in FIGS. 1 and 3. Although it is not necessary that N be an integer, the microprocessor which implements some aspects of the present invention is better able to process calculations if N is an integer. In the present embodiment of the invention, N=768. When the circuit is first assembled,it is not necessary to determine the relative angular positions of the stepper motor rotor and encoder 38 on the motor shaft. Any arbitrary angular displacement between the two works equally as well as any other.

Conventional logic (not shown) is used to connect the output of encoder 38, which is the count generated by the encoder, to the input of a position register 40. The position register increments or decrements count as the motor shaft rotates, depending upon the direction of rotation. The count in position register 40 thus represents the absolute position, identified as Keφout in FIGS. 1 and 3, of the motor shaft in encoder counts.

Figure 3:
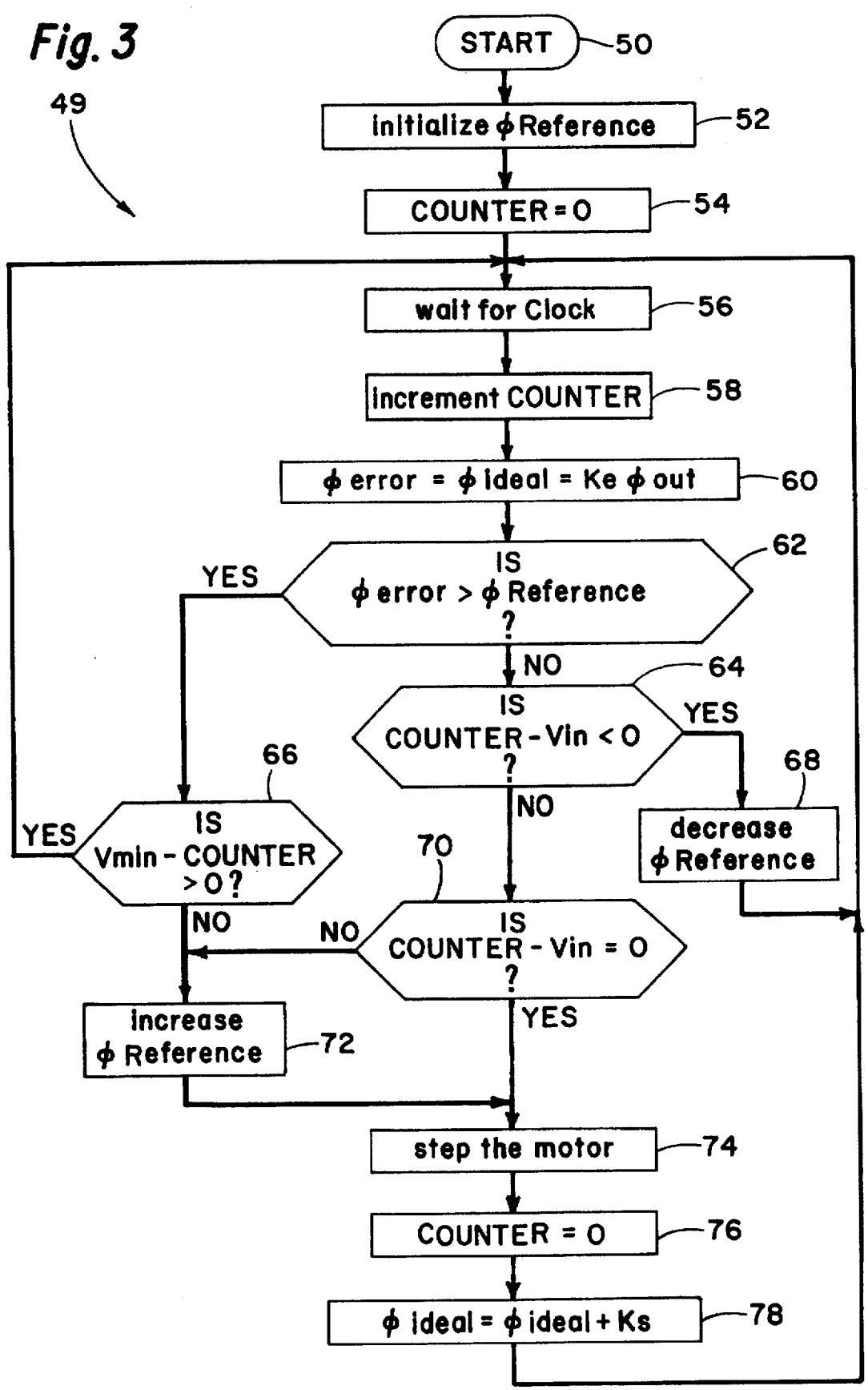
FIG. 3 is a flow chart illustrating the manner in which the schematic of FIG. 1 operates.

A position generator 42 is a register which stores a count representing of the desired or ideal motor shaft position, identified as φideal in both FIGS. 1 and 3. Position generator 42 increments or decrements by an mount equal to the number of encoder counts per motor commutation each time a step signal is generated on output terminal 20. Because stepper motor 26 has 48 commutations (in half steps) per revolution, the number of encoder counts per commutation equals N/48=768/48=16. This parameter is defined as Ks, the gain of position generator 42.

It can thus be seen that position register 40 provides a count representative of the actual position of the shaft of motor 26 while position generator 42 provides a count equal to the position at which the shaft will be when the current step is complete. The error, identified as φerror in FIGS. 1 and 3 is thus equal to φideal minus Keφout. The parameter φReference is a control variable produced by logic 12 and applied to a conductor 45. φReference is the lag angle or switching angle to which φerror is compared. As will later be described in connection with the operation of control circuit 10, φReference is automatically calculated during the operation of the control system, although an initial value for φReference may be supplied when circuit 10 first starts. The value appearing on conductor 44 equals φerror−φReference.

$V_{min}$ and $V_{in}$ are fixed parameter inputs to the control system. $V_{min}$ and $V_{in}$ are both integers and are each compared with the count in resetable counter 16. The counter 16 count is equal to the number of CLOCK pulses appearing on conductor 14 since the last step signal was generated on output terminal 20. As will later become more fully evident in connection with the description of the operation of circuit 10, the value chosen for $V_{min}$ decides the minimum commutation rate and thus the minimum velocity of the motor output shaft. Similarly, the value chosen for $V_{in}$ determines the commutation rate at the target velocity for motor 26 which, as will also be discussed further, is also the maximum velocity of the motor. The difference between $V_{min}$ and the count in counter 16 is applied to a conductor 46 which in turn is applied to control logic 12. The difference between $V_{in}$ and the count in counter 16 is applied to a conductor 48 and from there to control logic 12.

Turning now to FIG. 3, consideration will now be given to the manner in which circuit 10 controls stepper motor 26. Indicated generally at 49 in FIG. 3 is a flow chart which depicts the logical operation of circuit 10. Each of the steps or decision points in flow chart 49 is contained in one of boxes 50–78.

When the system is first energized, a preselected value for φReference is generated by control logic 12 and applied to conductor 45. The initial value is not necessarily arbitrary but need not be selected with precision. A person having ordinary skill in the art to which the present invention relates can select a suitable initial value for φReference. The initial value is the value in FIG. 4E at t=0. After the initial value is selected, resetable counter 16 is set to zero in box 54 of flow chart 49.

In box 56, circuit 10 waits for the next CLOCK pulse on conductor 14 in FIG. 1. When the next pulse occurs, counter 16 increments by one and φerror is calculated in box 60. φerror is calculated upon each occurrence of a CLOCK phase.

Figure 4A:
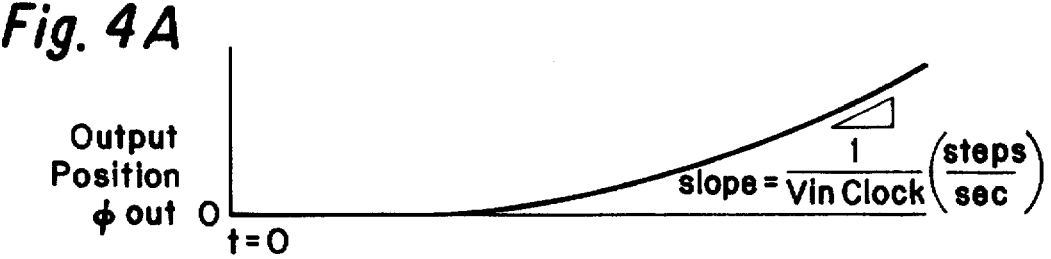
FIGS. 4A–4F are a series of exemplary waveforms generated by the circuit of FIG. 1.

With reference now to FIG. 4A, φout, the actual shaft position, is plotted versus time. During the course of the time period of FIG. 4A, a number of steps are applied to motor 26 to start shaft rotation.

Figure 4B:

FIG. 4B is a plot of Keφout which is a count taken from encoder 38 and is therefore proportional to φout.

Figure 4C:
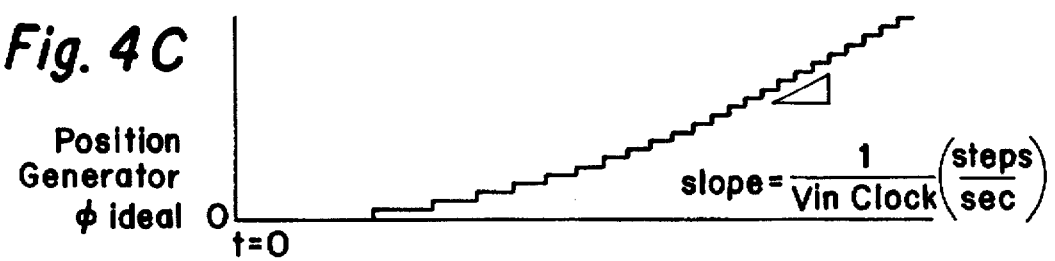

FIG. 4C is plot of the count in position generator 42. As will be recalled, each time a step signal is generated by control logic 12 and applied to terminal 20, position generator 42 increments by an amount equal to the number of encoder counts taken by encoder 38 as the shaft passes through each half step, namely 16 in the present embodiment of the invention. Thus, each vertical step in FIG. 4C represents a motor commutation.

Figure 4D:
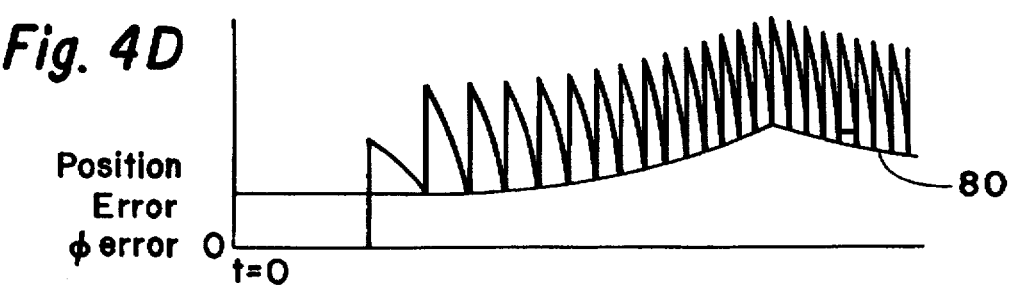

FIG. 4D is a plot of φerror which is equal to the signal of FIG. 4C minus the signal of FIG. 4B (shown on an enlarged scale in FIG. 4D). As in FIG. 4C, each vertical step in the signal corresponds to a commutation or step pulse generated on output terminal 20 of control logic 12. A curve 80 is drawn onto the plot of FIG. 4D to illustrate the magnitude of the error at each motor commutation.

Returning again to FIG. 3, after the error computation is performed in box 60, comparison is made to determine whether or not φerror is greater than φReference with the result being placed on conductor 44 in FIG. 1. If φerror is greater than φReference then the rotor has not yet reached the switching angle determined by φReference and is not yet ready to be commutated again. Control then transfers to box 66 in which $V_{min}$−COUNTER, the value of which appears on conductor 46, is examined to see whether or not it exceeds zero. As will be recalled, $V_{min}$ is an integer which determines the minimum commutation rate and thus the minimum velocity of motor 26. Even if the rotor has not reached the switching angle determined by φReference, it may be necessary to commutate it in order to maintain the minimum commutation rate. If $V_{min}$–COUNTER>0, i.e., it is not necessary to step the motor to maintain the minimum rate, control returns again to box 56 to wait for the CLOCK pulse.

Returning again to box 62, if φerror is not greater than φReference, control passes to box 64. The value of COUNTER–$V_{in}$ appears on conductor 48 in FIG. 1. As will be recalled, $V_{in}$ is an integer fixed parameter which determines the commutation rate at the target velocity which is also the maximum velocity of the motor. $V_{in}$ is equal to the minimum number of samples which must occur at the CLOCK sample rate between commutations of the motor. Therefore the sample rate, as determined by the periodic CLOCK signal, equals $V_{in}$ times the target commutation rate. Since $V_{in}$ is integer, the sample rate must also be an integer multiple of the maximum commutation rate. Thus, the maximum rate equals CLOCK/$V_{in}$. Because CLOCK is equal to $V_{in}$ times the target commutation rate, the target rate and the maximum rate are equal.

The minimum value for $V_{in}$ is 1. In the present embodiment of the invention $V_{in}$=8.

In box 64, if COUNTER –$V_{in}$<0, the maximum step rate is exceeded and control transfers to box 68 which reduces φReference by a predetermined amount and transfers control back to box 56. As will shortly be seen, assuming the motor is commutated at the minimum rate determined by $V_{min}$, no step signals are issued for so long as φerror exceeds φReference. Reduction of φReference thus reduces the switching angle and therefore the rate of acceleration of the motor.

Returning again to box 64, if COUNTER–$V_{in}$ is not less than zero, control passes to box 70 to determine whether or not COUNTER–$V_{in}$=0. If so, there have been exactly $V_{in}$ samples since the last commutation of the motor. Stepper motor 26 is therefore being commutated at the desired rate which, as noted above is also the maximum rate.

In box 74, control logic 12 issues a step signal on terminal 20 in FIG. 1 which also resets counter 16, as described in box 76. The step signal also advances position generator 42 by Ks, the position generator gain, and control is returned to box 56. Each vertical increment in FIG. 4E represents the occurrence of another step signal.

Returning again to box 70, if COUNTER–$V_{in}$≠0, the motor is rotating too slowly, i.e., the minimum number of commutations between steps has not occurred. If so, control transfers to box 72 where φReference is increased and thereafter to boxes 74, 76, 78 which step the motor, reset counter 16 and increment position generator 42 as described above. Increasing φReference increases the switching angle thereby increasing motor torque and thus motor velocity. Control is again returned to box 56.

It should be noted that the function of decreasing φReference in box 68 and increasing φReference in box 72 may comprise preselected fixed increases or decreases, with one being different from the other. Alternatively, the increases and decreases may be variable and equal to or different from one another. Changing the magnitude and amount of the adjustment to φReference changes the acceleration profile for the motor. These adjustments may be selected empirically to obtain a desired acceleration profile.

Figure 4E:
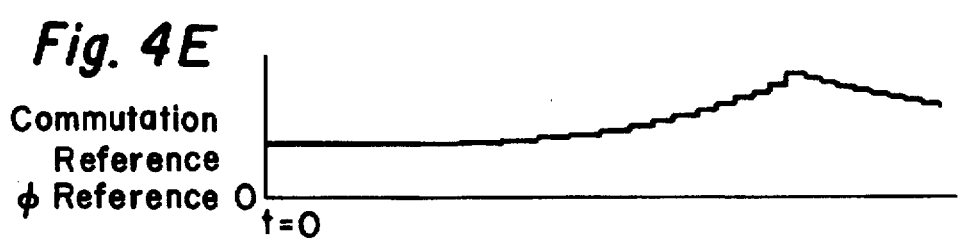
Figure 4F:
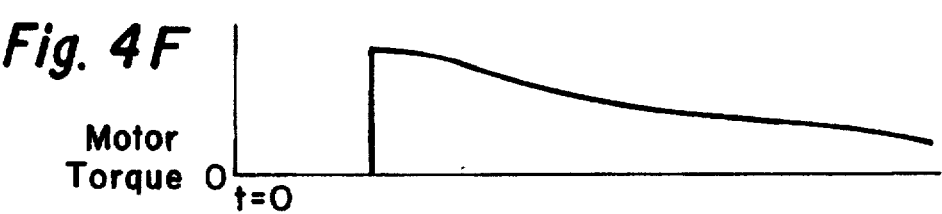

FIG. 4E is an example of how φReference changes with FIG. 4F being a plot of the corresponding motor torque.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A method for controlling a stepper motor having a driven rotor comprising the steps of:

initiating motor commutation with a first step;

repeatedly sampling rotor position;

comparing each sampled position with a desired rotor position;

calculating an error value for each of the compared positions;

commutating the motor each time the error value bears a predetermined relationship to a reference value; and adjusting the reference value responsive to rotor velocity.

2. The method of claim 1 wherein the first step is applied at a random switching angle.

3. The method of claim 1 wherein the step of commutating the motor each time the error value bears a predetermined relationship to a reference value comprises the step of commutating the motor when the error value is less than or equal to the reference value.

4. The method of claim 3 wherein the step of adjusting the reference value comprises the steps of:

determining rotor velocity;

comparing the rotor velocity with a predetermined velocity; and increasing the reference value if the rotor velocity is below the predetermined velocity.

5. The method of claim 3 wherein the step of adjusting the reference value comprises the steps of:

determining rotor velocity;

comparing the rotor velocity with a predetermined velocity; and decreasing the reference value if the rotor velocity is above the predetermined velocity.

6. Apparatus for controlling a stepper motor having a driven rotor comprising the steps of:

means for sampling rotor position;

means for generating a desired rotor position;

means for comparing each sampled position with a desired rotor position;

means for calculating an error value for each of the compared positions;

means for commutating the motor each time the error value bears a predetermined relationship to a reference value; and means for adjusting the reference value responsive to rotor velocity.

7. The apparatus of claim 6 wherein said means for adjusting the reference value comprises:

means for determining rotor velocity;

means for comparing the rotor velocity with a predetermined velocity; and means for increasing the reference value if the rotor velocity is below the predetermined velocity.

8. The apparatus of claim 6 wherein said means for adjusting the reference value comprises:

means for determining rotor velocity;

means for comparing the rotor velocity with a predetermined velocity; and means for decreasing the reference value if the rotor velocity is above the predetermined velocity.

9. The apparatus of claim 6 wherein said apparatus further includes means for stepping the motor at a preselected rate.

10. The apparatus of claim 9 wherein said means for sampling rotor position includes means for generating rotor position samples at a rate which is an integer submultiple of the preselected motor stepping rate.

11. The apparatus of claim 6 wherein said apparatus further includes means for providing a predetermined minimum number of rotor position samples between consecutive motor commutations.

* * * * *